US009161091B2

(12) United States Patent

Karaoguz et al.

(10) Patent No.: US 9,161,091 B2
(45) Date of Patent: Oct. 13, 2015

(54) PORTABLE MEDIA PROCESSING UNIT IN A MEDIA EXCHANGE NETWORK

(71) Applicant: BROADCOM CORPORATION, Irvine, CA (US)

(72) Inventors: Jeyhan Karaoguz, Irvine, CA (US); James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 374 days.

(21) Appl. No.: 13/723,567

(22) Filed: Dec. 21, 2012

(65) Prior Publication Data

US 2013/0117787 A1 May 9, 2013

Related U.S. Application Data

(60) Division of application No. 13/246,163, filed on Sep. 27, 2011, now Pat. No. 8,355,750, which is a continuation of application No. 12/259,861, filed on Oct. 28, 2008, now Pat. No. 8,027,995, which is a continuation of application No. 10/675,122, filed on Sep. 30, 2003, now Pat. No. 7,444,336.

(60) Provisional application No. 60/457,179, filed on Mar. 25, 2003, provisional application No. 60/445,006, filed on Feb. 5, 2003, provisional application No. 60/443,894, filed on Jan. 30, 2003, provisional application No. 60/432,472, filed on Dec. 11, 2002.

(51) Int. Cl.

*H04N 21/482* (2011.01)
*H04L 29/06* (2006.01)

(Continued)

(52) U.S. Cl.

CPC ...... *H04N 21/4823* (2013.01); *H04L 29/06027* (2013.01); *H04L 65/80* (2013.01); *H04L 67/06* (2013.01); *H04L 67/306* (2013.01); *H04L 67/325* (2013.01); *H04L 67/327* (2013.01); *H04N 7/141* (2013.01); *H04N 7/163* (2013.01); *H04N 7/17309* (2013.01); *H04N 7/17318* (2013.01); *H04N 7/17336* (2013.01); *H04N 7/18* (2013.01); *H04N 21/222* (2013.01); *H04N 21/2343* (2013.01); *H04N 21/23106* (2013.01); *H04N 21/234363* (2013.01); *H04N 21/2408* (2013.01); *H04N 21/254* (2013.01); *H04N 21/258* (2013.01); *H04N 21/2541* (2013.01); *H04N 21/2543* (2013.01); *H04N 21/25435* (2013.01); *H04N 21/25808* (2013.01); *H04N 21/25833* (2013.01); *H04N 21/25875* (2013.01); *H04N 21/25891* (2013.01); *H04N 21/2668* (2013.01); *H04N 21/26266* (2013.01); *H04N 21/2743* (2013.01); *H04N 21/2747* (2013.01); *H04N 21/4126* (2013.01);

(Continued)

(58) Field of Classification Search

CPC combination set(s) only.
See application file for complete search history.

(56) References Cited

U.S. PATENT DOCUMENTS 7,444,336 B2 * 10/2008 Karaoguz et al. ..................... 1/1
8,027,995 B2 * 9/2011 Karaoguz et al. ............. 707/791

(Continued)

*Primary Examiner* — Diane Mizrahi

(74) *Attorney, Agent, or Firm* — Garlick & Markison; Randy W. Lacasse

(57) ABSTRACT

A method for communication includes performing by one or more circuits integrated within a single chip in a first communication device, functions that include storing media and meta-data corresponding to the stored media. The storing may occur at a first location of the first communication device. A channel guide including representations of the stored media that can be selected for presentation on a television in a second location, may be caused based on the meta-data corresponding to the stored media when the first communication device is communicatively coupled to a second communication device at the second location. In response to receiving a selection via the presented channel guide, at least one media file corresponding to the received selection may be displayed based on the meta-data corresponding to the stored media, on one or both of the television and/or a media player in the second location.

20 Claims, 14 Drawing Sheets

(51) Int. Cl.

| | |
|---|---|
| ***H04N 7/14*** | (2006.01) |
| ***H04N 7/16*** | (2011.01) |
| ***H04N 7/173*** | (2011.01) |
| ***H04N 7/18*** | (2006.01) |
| ***H04N 21/222*** | (2011.01) |
| ***H04N 21/231*** | (2011.01) |
| ***H04N 21/2343*** | (2011.01) |
| ***H04N 21/24*** | (2011.01) |
| ***H04N 21/254*** | (2011.01) |
| ***H04N 21/2543*** | (2011.01) |
| ***H04N 21/258*** | (2011.01) |
| ***H04N 21/262*** | (2011.01) |
| ***H04N 21/2668*** | (2011.01) |
| ***H04N 21/2743*** | (2011.01) |
| ***H04N 21/2747*** | (2011.01) |
| ***H04N 21/41*** | (2011.01) |
| ***H04N 21/414*** | (2011.01) |
| ***H04N 21/4143*** | (2011.01) |
| ***H04N 21/422*** | (2011.01) |
| ***H04N 21/4223*** | (2011.01) |
| ***H04N 21/4227*** | (2011.01) |
| ***H04N 21/426*** | (2011.01) |
| ***H04N 21/431*** | (2011.01) |
| ***H04N 21/433*** | (2011.01) |
| ***H04N 21/436*** | (2011.01) |
| ***H04N 21/4363*** | (2011.01) |
| ***H04N 21/442*** | (2011.01) |
| ***H04N 21/45*** | (2011.01) |
| ***H04N 21/458*** | (2011.01) |
| ***H04N 21/462*** | (2011.01) |
| ***H04N 21/4627*** | (2011.01) |
| ***H04N 21/466*** | (2011.01) |
| ***H04N 21/472*** | (2011.01) |
| ***H04N 21/475*** | (2011.01) |
| ***H04N 21/4782*** | (2011.01) |
| ***H04N 21/4786*** | (2011.01) |
| ***H04N 21/4788*** | (2011.01) |
| ***H04N 21/485*** | (2011.01) |
| ***H04N 21/488*** | (2011.01) |
| ***H04N 21/61*** | (2011.01) |
| ***H04N 21/63*** | (2011.01) |
| ***H04N 21/6402*** | (2011.01) |
| ***H04N 21/658*** | (2011.01) |
| ***H04N 21/6583*** | (2011.01) |
| ***H04N 21/6587*** | (2011.01) |
| ***H04N 21/81*** | (2011.01) |
| ***H04N 21/84*** | (2011.01) |
| ***H04L 29/08*** | (2006.01) |
| *H04L 12/28* | (2006.01) |

(52) U.S. Cl.

CPC .... *H04N 21/4143* (2013.01); *H04N 21/41407* (2013.01); *H04N 21/41422* (2013.01); *H04N 21/422* (2013.01); *H04N 21/4223* (2013.01); *H04N 21/4227* (2013.01); *H04N 21/42684* (2013.01); *H04N 21/436* (2013.01); *H04N 21/4312* (2013.01); *H04N 21/4314* (2013.01); *H04N 21/4316* (2013.01); *H04N 21/4331* (2013.01); *H04N 21/4334* (2013.01); *H04N 21/43615* (2013.01); *H04N 21/43632* (2013.01); *H04N 21/43637* (2013.01); *H04N 21/442* (2013.01); *H04N 21/44222* (2013.01); *H04N 21/458* (2013.01); *H04N 21/4532* (2013.01); *H04N 21/4622* (2013.01); *H04N 21/4627* (2013.01); *H04N 21/4668* (2013.01); *H04N 21/4751* (2013.01); *H04N 21/4753* (2013.01); *H04N 21/4755* (2013.01); *H04N 21/4758* (2013.01); *H04N 21/4782* (2013.01); *H04N 21/4786* (2013.01); *H04N 21/4788* (2013.01); *H04N 21/47202* (2013.01); *H04N 21/47214* (2013.01); *H04N 21/482* (2013.01); *H04N 21/4821* (2013.01); *H04N 21/4826* (2013.01); *H04N 21/4828* (2013.01); *H04N 21/4856* (2013.01); *H04N 21/4882* (2013.01); *H04N 21/6125* (2013.01); *H04N 21/6187* (2013.01); *H04N 21/632* (2013.01); *H04N 21/6402* (2013.01); *H04N 21/6581* (2013.01); *H04N 21/6582* (2013.01); *H04N 21/6583* (2013.01); *H04N 21/6587* (2013.01); *H04N 21/812* (2013.01); *H04N 21/814* (2013.01); *H04N 21/8113* (2013.01); *H04N 21/8146* (2013.01); *H04N 21/84* (2013.01); *H04L 12/2803* (2013.01); *H04L 12/2812* (2013.01); *H04L 2012/2841* (2013.01); *H04L 2012/2849* (2013.01); *Y10S 707/99945* (2013.01)

(56) References Cited

U.S. PATENT DOCUMENTS

| | | | | |
|---|---|---|---|---|
| 8,355,750 | B2 * | 1/2013 | Karaoguz et al. | 455/553.1 |
| 2011/0225417 | A1 * | 9/2011 | Maharajh et al. | 713/150 |
| 2012/0069131 | A1 * | 3/2012 | Abelow | 348/14.01 |
| 2014/0244429 | A1 * | 8/2014 | Clayton et al. | 705/26.7 |

* cited by examiner

800

801

| | HOUR, DAY | | | | |
|---|---|---|---|---|---|
| CHANNELS | << 1PM | 2PM | ... | 6PM | 7PM >> |
| Family Vacations | | | | | |
| Kids sports | | | | | |
| ⋮ | | | | | |
| Vacation in Alaska Video 802 | Normal Estimated Delivery Time:<br>2 Hrs 13 mins<br>Cost: $0.59 (Without Queuing) | | Showing All day (48 mins)<br>Earliest Order Time: 4:00 PM<br>MPEG-2, 1.5 Mbps | | |
| Vacation in Alaska Video 803 | Express Estimated Delivery Time:<br>18 mins<br>Cost: $1.20 (With Queuing) | | Showing All day (48 mins)<br>Earliest Order Time: 4:00 PM<br>MPEG-2, 4 Mbps | | |
| Vacation in Alaska Video 804 | Overnight Delivery:<br>available Next Morning<br>Cost: $0.05 (Server Stored) | | Showing All day (48 mins)<br>Earliest Order Time: 4:00 PM<br>MPEG-2, 19 Mbps | | |

Fig. 8

PORTABLE MEDIA PROCESSING UNIT IN A MEDIA EXCHANGE NETWORK

REFERENCE

The present U.S. Utility Patent Application claims priority pursuant to 35 U.S.C. §121, as a divisional, to the following U.S. Utility Patent Application which is hereby incorporated herein by reference in its entirety and made part of the present U.S. Utility Patent Application for all purposes:

1. U.S. Utility application Ser. No. 13/246,163 entitled "Portable Media Processing Unit in a Media Exchange Network," filed Sep. 27, 2011, co-pending, which is a continuation of U.S. patent application Ser. No. 12/259,861 filed Oct. 28, 2008, now U.S. Pat. No. 8,027,995, which is a continuation of U.S. patent application Ser. No. 10/675,122 filed Sep. 30, 2003, now U.S. Pat. No. 7,444,336, which makes reference to, claims priority to, and claims the benefit of:

a. U.S. Provisional Application Ser. No. 60/457,179 filed Mar. 25, 2003;

b. U.S. Provisional Application Ser. No. 60/445,006 filed Feb. 5, 2003;

c. U.S. Provisional Application Ser. No. 60/443,894 filed Jan. 30, 2003; and d. U.S. Provisional Application Ser. No. 60/432,472 filed Dec. 11, 2002.

This application also makes reference to:

U.S. application Ser. No. 10/657,390 filed Sep. 8, 2003, now U.S. Pat. No. 7,496,647; and U.S. application Ser. No. 10/660,267 filed Sep. 11, 2003, now U.S. Pat. No. 7,496,665.

All of the above stated applications are incorporated herein by reference in their entirety.

FIELD OF THE INVENTION

Certain embodiments of the invention relate to transporting of digital media. In particular, certain embodiments of the invention relate to a method and system for portable transferring of a plurality of digital media types from a PC environment to a media consumption environment using a single storage medium.

BACKGROUND OF THE INVENTION

A personal computer (PC) may be utilized to consume various types of media including images, video and audio. Files of various media, referred to as media files, may be downloaded to a personal computer from various sources including other personal computers, media peripherals such as digital cameras and personal digital assistants (PDAs), host system or servers, or from web sites on the Internet. Media files such as those downloaded from a first personal computer, may be saved to a portable storage medium such as a floppy disk, a memory card, a compact flash memory card, a compact disc (CD), and/or a digital versatile disc (DVD), for example. A floppy disk, memory card or compact disc, for example, may be manually transported to a second personal computer that is remotely located from the first personal computer. The media files on the floppy disk, memory card and/or CD may then be saved and/or consumed on the second personal computer. Once on the second computer, the media files may again be transported to a third location via, for example, the floppy disk or the memory card. The floppy disk may be utilized to store digital image files, the compact disc to store digital music files and the digital versatile disc to store movies. Accordingly, the types of media files may play a role in the type of media that may be utilized to transport the files.

A compact disc may also be transported to a compact disc player at a location that is remote from the first personal computer and stored media files on the compact disc may be consumed on the compact disc player. Similarly, a digital versatile disc may be transported to a DVD player at a location remote from the first personal computer and media that are stored on the DVD may be consumed by the DVD player and viewed on a television coupled to the DVD player. For example, the DVD may store digital video of a child's sporting event that was recorded by the child's father with a digital camcorder, downloaded to a personal computer, and saved to the DVD.

Accordingly, it may be recognized that different types of consumable media often require different types of portable storage media and different types of media players to consume the stored media.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain aspects of the invention may be found in a method and system for porting information between locations in a communication network. The method may comprise storing media along with metadata associated with the stored media on a storage unit coupled to a communication device at a first location. If the storage unit is transferred to a second location such as a home and coupled to a second communication device at the home, a channel guide comprising representations of the stored media may be presented on a television in the home. In response to receiving a selection via the presented channel guide, at least one media file corresponding to the received selection may be presented or displayed on the television and/or a media player such as an audio player in the home. The storage unit may be a media processing unit.

The stored media may be received at the first location via a wired and/or a wireless interface. Metadata associated with the displayed file may be displayed on for example, a television screen at the home. At least a portion of the media may be transferred from the storage unit and/or stored in a storage device associated with the television and/or a media player in the home. The presenting of the representation of the stored media within the channel guide may be scheduled based on at least a portion of the stored metadata. At least a portion of the metadata may be generated by and/or within the storage unit. In accordance with an aspect of the invention, metadata associated with the displayed media file may be displayed independent of the media file itself. At least one media file received from the second communication device may be stored on the storage unit when the storage unit is coupled to the second communication device.

Another embodiment of the invention may provide a machine-readable storage, having stored thereon, a computer program having at least one code section for porting information between locations in a communication network. The at least one code section may be executable by a machine, thereby causing the machine to perform the steps as described above for porting information between locations in a communication network.

Certain embodiments of the system for porting information between locations in a communication network may provide a storage unit processor that stores media along with metadata associated with the stored media on the storage unit when the storage unit is coupled to a communication device at a first location. The storage unit may be a media processing unit and may also comprise a media exchange software platform that may include a media exchange software processor. The processor may be adapted to cause a channel guide, media guide and/or device guide comprising representations of the stored media to be presented or displayed on a television in the home whenever the storage unit is transferred to a second location such as a home and coupled to a second communication device at the home. In response to receiving a selection via the presented channel guide, the processor may be adapted to display at least one media file corresponding to the received selection on television and/or a media player such as an audio player located in the home. The processor may receive the stored media at the first location via a wired and/or a wireless interface. Notwithstanding, the processor may cause metadata information associated with the file to be also displayed.

The processor may be further adapted to transfer at least a portion of the stored media from the storage unit to a storage device associated with the television and/or a media player located within the home. At least a portion of the transferred media may be stored on a storage device associated with the television and/or the media player within the home by the processor. In accordance with an aspect of the invention, the processor may schedule the presenting of the representation of the stored media within the channel guide based on at least a portion of the stored metadata, the latter of which may be generated by and/or within the storage unit. In an aspect of the invention, the processor may also be adapted to cause metadata information to be displayed independent of the media file. Media files received from the second communication device whenever the storage unit is coupled to the second communication device, may also be stored in the storage unit by the processor.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 8 is an exemplary illustration of a TV guide channel user interface showing several options of a pushed media in accordance with an embodiment of the present invention.

DETAILED DESCRIPTION OF THE INVENTION

Certain aspects of the invention comprise a method and system for porting information between locations in a communication network. The method may comprise the step of storing media along with metadata associated with the stored media on a storage unit which may be a media processing unit that is coupled to a communication device at a first location. In instances where the storage unit is transferred to a second location such as a home and coupled to a second communication device at the home, a channel guide comprising representations of the stored media may be presented on a television located in the home. In response to receiving a selection via the presented channel guide, a media file corresponding to the received selection may be presented or displayed on the television and/or a media player such as an audio player located in the home.

The stored media may be received at the first location via a wired and/or a wireless interface. Notwithstanding, metadata associated with the displayed file may be displayed on for example, a television screen. At least a portion of the media may be transferred from the storage unit and/or stored in a storage device associated with the television and/or a media player located in the home. The presenting of the representation of the stored media within the channel guide may be scheduled based on at least a portion of the stored metadata. At least a portion of the metadata may be generated by and/or within the storage unit. Metadata associated with the displayed media file may be displayed independently of the media file itself in accordance with an aspect of the invention. At least one media file received from the second communication may be stored on the storage unit whenever the storage unit is coupled to the second communication device.

Figure 1A:
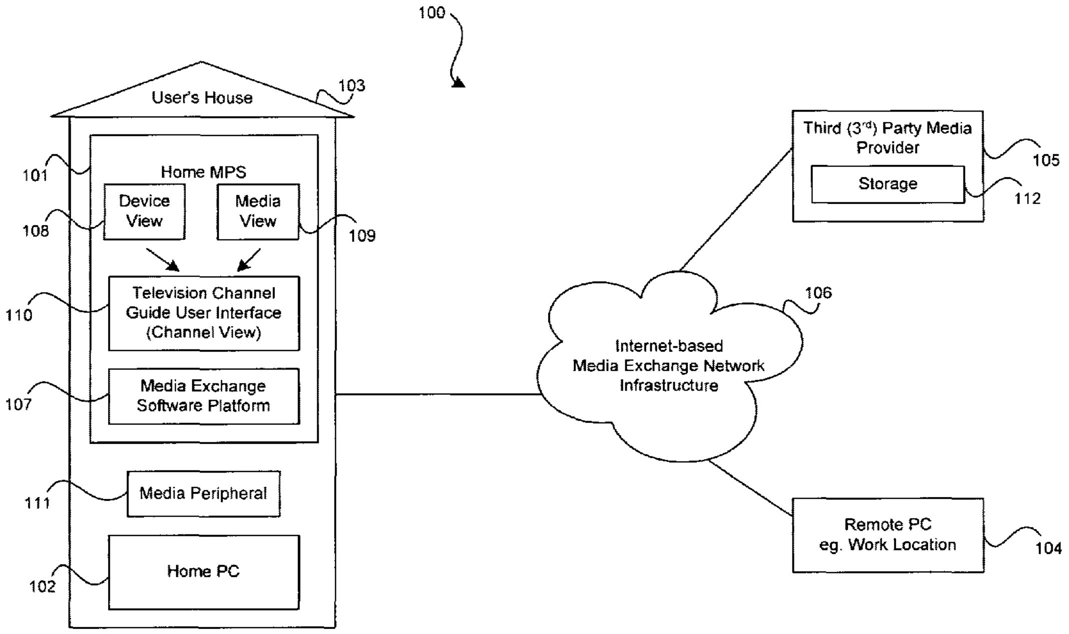
FIG. 1A is a diagram illustrating an embodiment of a communication network that may be utilized in connection with supporting portable transfer of a plurality of media types from a personal computer environment to an environment in which media may be consumed or a media consumption environment utilizing a media processing unit (MPU) in accordance with various aspects of the invention.

FIG. 1A is a diagram illustrating an embodiment of a communication network 100 that may be utilized in connection with supporting portable transfer of a plurality of media types from a personal computer environment to an environment in which media may be consumed or a media consumption environment utilizing a media processing unit (MPU) in accordance with various aspects of the invention. The communication network 100 may be a network for communicating or exchanging media and may be referred to as a media exchange network. Referring to FIG. 1A, the media exchange network 100 may include a media processing system (MPS) 101, a PC 102 and a media peripheral 111. The media processing system 101, the PC 102 and the media peripheral 111 may be situated at a first location 103 such as a first home, which may be a user's home 103. Accordingly, the media processing system 101 may be referred to as a home media processing system 101 and the PC 102 referred to as a home PC 102. The media exchange network 100 may also include a remote PC 105 and a third (3rd) party media provider 105. The third (3rd) party media content provider 105 may supply third (3rd) party media content on the media exchange network 100. The third (3rd) party media content provider 105 may include at least one storage system 112. The storage system may include, but is not limited to, a database, a CD tower, a jukebox, a magnetic disk, an optical disk, a solid state memory device, a tape device, and a media peripheral, a server, a media processing system and a computer having various memory and/or storage devices.

A media processing system may also comprise a set-top-box (STB), a PC, and/or a television with a media management system (MMS). A media management system may also be referred to as a media exchange software (MES) platform. Notwithstanding, a media management system may include a software platform operating on at least one processor that may provide certain functionality including user interface functionality, distributed storage functionality, networking functionality, and automatic control and monitoring of media peripheral devices. For example, a media management system may provide automatic control of media peripheral devices, automatic status monitoring of media peripheral devices, and inter-home media processing system routing selection. A media processing system may also be referred to as a media-box and/or an M-box. Any personal computer may indirectly access and/or control any media peripheral device in instances where the personal computer may include a media management system. Such access and/or control may be accomplished through various communication pathways via the media processing system or outside of the media processing system. A media processing system may also have the capability to automatically access and control any media peripheral device without user interaction and/or with user intervention. A personal computer (PC) may include media exchange software running on or being executed by the personal computer and may be referred to as a media processing system. The media processing system may also include a speech recognition engine that may be adapted to receive input speech and utilize the input speech control various functions of the media processing system.

Each of the elements or components of the network for communicating media or media exchange network may be identified by a network protocol address or other identifier which may include, but is not limited to, an Internet protocol (IP) address, a media access control (MAC) address and an electronic serial number (ESN). Examples of elements or components that may be identified by such addresses or identifiers may include media processing systems, media management systems, personal computers, media or content providers, media exchange software platforms and media peripherals.

The media exchange network 100 may further include an Internet-based media exchange network infrastructure 106 that may provide an access and/or transport medium for the home media processing system 101, the home personal computer 102, the remote PC 104 and the third (3rd) party media provider 105. A personal computer comprising media exchange software running on and/or being executed by the personal computer, may also be referred to as a media processing system.

The home media processing system 101 may include media exchange software (MES) platform 107 providing a device view or guide 108, a media view or guide 109 and/or a television channel view or guide user interface 110 to a user of the home media processing system 101. The television channel guide user interface 110 may also be referred to as a channel view 110. In accordance with an embodiment of the invention, the home personal computer 102 and the remote personal computer 104 may also each include a media exchange software platform, which may provide a device view, media view and/or channel view.

The device view 108 may include a table of devices on the media exchange network 100 and corresponding media content categories within those devices. The media view 109 may include a table of media content categories on the media exchange network and corresponding specific media content within those categories. The television channel guide user interface or channel view 110 may present or display a list of channels and corresponding programmed media content scheduled by time and date, for example.

The media exchange software platform 107 may also provide the functional capability that may allow a user of the media processing system 101 to personally program media channels with media content using, for example, a remote control. In this regard, the remote control may be adapted to interact with or otherwise control the operation of the media processing system 101. Similarly, the media exchange platforms in home personal computer 102 and remote personal computer 104 may also provide the functional capability that may permit a user of the home personal computer 102 and/or the remote personal computer 104 to personally program media channels with media content. In this regard, the user may utilize an input device that may function as an I/O device and/or navigation tool to program the media channels. For example, a mouse, a touch-screen display and/or a keyboard may be utilized to interact with the personal computers 102, 104. Media content may be accessed by a user via the device view or guide 108, the media view or guide 109, and/or from another source such as a media peripheral 111 and/or a third ($3^{rd}$) party media provider 105.

Figure 1B:
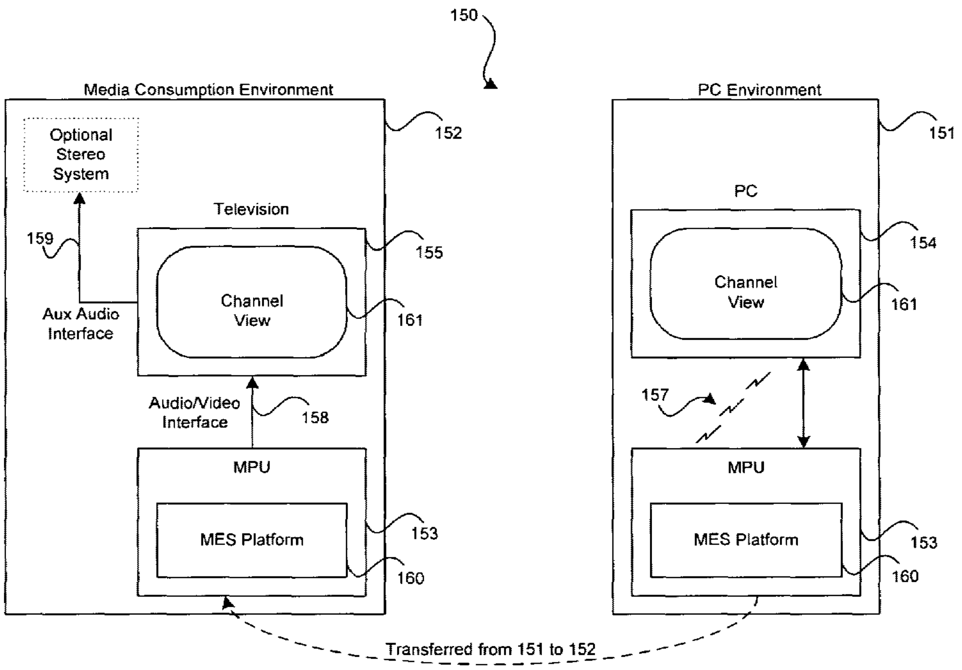
FIG. 1B is a diagram illustrating an embodiment of a media environment supporting the portable transfer of a plurality of media types from a PC environment to a media consumption environment using a media processing unit, in accordance with various aspects of the present invention.

FIG. 1B is a diagram illustrating an embodiment of a media environment 150 supporting the portable transfer of a plurality of media types from a personal computer environment 151 to a media consumption environment 152 using a media processing unit (MPU) 153, in accordance with various aspects of the present invention. Referring to FIG. 1B, there is shown a personal computer environment 151 and a media consumption environment 152.

The personal computer environment 151 may comprise a personal computer 154 and a media processing unit 153. The media processing unit 153 may be adapted to facilitate download of media to the personal computer 154. The personal computer 154 may have a channel view or channel guide 161 displayed thereon. A device guide or media guide may also be displayed thereon. The media processing unit 153 of the personal computer environment 151 may also include a media exchange server (MES) platform 160.

In accordance with an embodiment of the present invention, the personal computer 154 may be coupled to the media processing system unit 153 of the personal computer environment through a wired and/or a wireless interface 157. The wired interface may be, for example, a PCI, PCI-X, USB, IEEE 1394 or other interface suitable interface. The wireless interface 157 may be, for example, Bluetooth, 802.11 x, Infrared (IR) or other suitable wireless interface. The personal computer 104 may comprise a desktop personal computer, a notebook computer, a handheld computer, a personal digital assistant (PDA), or other computing device.

The media consumption environment 152 may comprise a television 155 and a media processing unit 153. The media processing unit 153 of the media consumption environment may be adapted to facilitate consumption of the media by, for example, the television 155. The television 155 may also have a channel view or channel guide 161 displayed thereon. The media processing unit 153 of the media consumption environment may include a media exchange server (MES) platform and an audio/video interface 158. The television 155 may be coupled to the audio/video interface 158 of the media processing unit 153 of the media consumption environment 152. Consumption of media may include playback, viewing and/or listening, and/or other similar functions. The television 155 may also comprise an auxiliary audio interface 159.

Although not shown, the media processing unit 153 may include an internal power source such as a battery pack that may be recharged from time-to-time. The internal power source may function as a secondary power source. Accordingly, the media processing unit 153 may operate utilizing power from the battery pack if a primary power source fails.

The media consumption environment 152 also comprise a stereo or other audio presentation system 156. The stereo or other audio presentation system 156 may be optional. In accordance with an embodiment of the invention, the media processing unit 153 of the media consumption environment may be coupled to the television 155 through an auxiliary video/audio interface 158. The optional stereo system 156 may be coupled to the television 155 through an auxiliary audio interface 159. In an alternative embodiment of the invention, the optional stereo system 156 may be coupled directly to the media processing unit 153 of the media consumption through an auxiliary audio interface.

The media exchange software (MES) platform 160 may be adapted to provide a channel view 161 that may be displayed on a monitor of the personal computer 154 in the personal computer environment 151 and/or on a screen or display of the television 155 in the media consumption environment 152. The channel view or channel guide 161 may comprise a table of media channels and scheduled media program content. The media exchange software platform 160 may allow media content to be downloaded from the personal computer 154 to the channel view or channel guide 161 of the media processing unit 153 in the personal computer environment 151. The media exchange software platform 110 may also provide functionality, for example, via sub menus that may be adapted to facilitate for selecting and viewing of the media content.

Figure 1C:
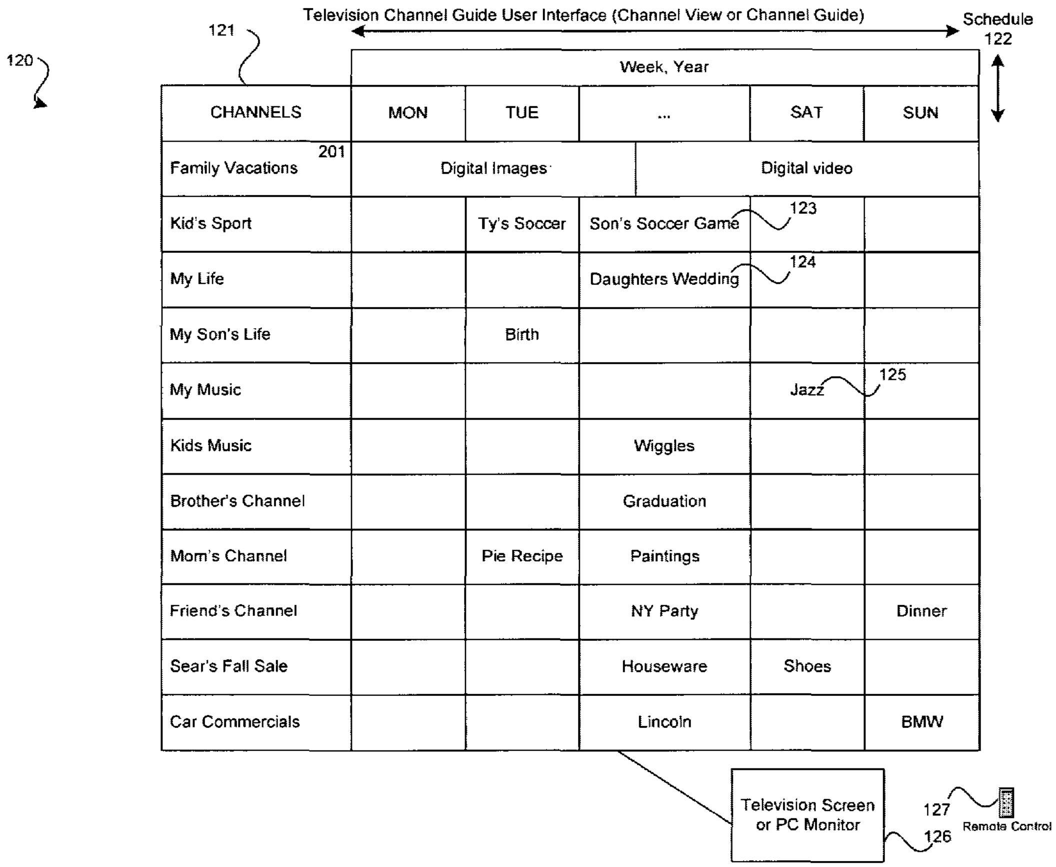
FIG. 1C is a diagram illustrating an embodiment of the channel view or channel guide provided by the media processing unit of FIG. 1B, in accordance with various aspects of the present invention.

FIG. 1C is a diagram illustrating an embodiment of the channel view 161 provided by the media processing unit 153 of FIG. 1B, in accordance with various aspects of the present invention. Referring to FIG. 1C, the channel view or channel guide 161 such as channel guide 120 may comprise a set of personal media channels 121 and a schedule 122. Media content titles that are associated with a certain media channel may be displayed on the channel view or channel guide 120 at particular scheduled times. The media content titles refer to the media content that is stored on the media processing unit 153. The media content may be displayed in a media guide, while devices and their corresponding media may be presented in a media view. U.S. patent application Ser. No. 10/675,382 filed Sep. 30, 2003 and U.S. patent application Ser. No. 10/675,467 filed Sep. 30, 2003 provides exemplary media view or guide, device view or guide, and channel view or guide, and are hereby incorporated herein by reference in their entirety.

Figure 2:
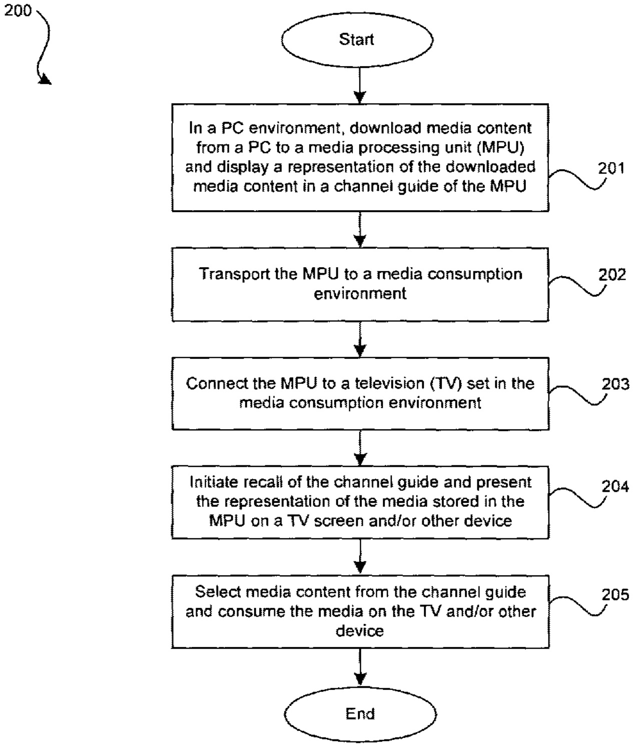
FIG. 2 is a flowchart illustrating a method 200 and exemplary steps that may be utilized to accomplish the portable transfer of a plurality of media content types from the PC environment 151 of FIG. 1B to the media consumption environment 152 of FIG. 1B using the media processing unit 153 of FIG. 1B, in accordance with various aspects of the present invention.

FIG. 2 is a flowchart illustrating a method 200 and exemplary steps that may be utilized to accomplish the portable transfer of a plurality of media content types from the PC environment 151 of FIG. 1B to the media consumption environment 152 of FIG. 1B using the media processing unit 153 of FIG. 1B, in accordance with various aspects of the present invention. Referring to FIG. 2, in step 201, in a personal computer environment, media content is downloaded from a personal computer to a media processing unit and a representation of the downloaded media content presented or, displayed within a channel guide associated with the media processing unit. In step 202, the media processing unit is transported to a media consumption environment. In step 203, the media processing unit is connected to a television in the media consumption environment. In step 204, recall of the channel guide may be initiated and the representations of the media that is stored in the media processing unit may be presented or displayed on a television screen coupled to the media processing unit and/or other device. In step 205, media content is selected from the channel guide and the media content is consumed, for example, being viewed and/or heard.

In an illustrative embodiment of the invention, with reference to FIG. 1B and FIG. 1C, a user of the personal computer 154 may have several types of media content stored on the personal computer 154. The media content may comprise digital pictures of a “son’s soccer game” 123, digital video of a “daughter’s wedding” 124, and digital audio of “Jazz music” 125 of FIG. 1C. The user may connect the media processing unit 153 to the personal computer 154 via a USB interface 157. As described in step 201 of the method 200, the user may download the media content 123, 124, 125 to the channel view 111 or channel guide 120 of the media processing unit 153. The media exchange software platform 160 may be adapted to provide the channel view or channel guide 161 and the functionality to download or transfer representation of the media content to the channel view 161 or channel guide 120 in the media processing unit 153. As a result, the media content 123, 124, 125 may be stored in memory of the media processing unit 153 and made accessible in a user-friendly format through a television channel guide such as the channel view 161 or channel guide 120. Referring in particular to FIG. 1C, the downloaded media content may be illustrated as it may appear in the channel view 161 or channel guide 120 including “son’s soccer game” 123, “daughter’s wedding” 124, and “Jazz music” 125.

In accordance with an embodiment of the invention, the digital media content is stored in the media processing unit 103, for example, as a meta file containing metadata and raw digital media content. Each media content may be associated with a separate meta file. Metadata may comprise many types of characteristic and attribute information including the title or name of the media program content, the date and time the media program content was generated, a history containing dates and authorship of production changes to the media program content, channel information and related submenus or sub-title information, file attributes, queuing information, quality of service (QoS) attributes, security functions, authorization functions, encryption functions, encoding schemes, data rate, and compression schemes. The file type or format may be, for example, MPEG 2, MP3, WMA, WAY, video CD, audio CD and/or raw text. Queuing information may comprise, for example, a time to deliver the media program content and delay attributes. Quality of service attributes may comprise, for example, resolution and number of pixels. File attributes may comprise, file format and media content type, file size and a description of the media program content.

The media exchange software platform 160 may be adapted to facilitate generation of the metadata and resultant meta file information. In accordance with various aspects of the present invention, metadata may be stored in a single file along with the media program content with a clear delineation between the two in the file. Alternatively, the metadata may be stored in a first file and the media program content may be stored in a second file. The metadata may include a pointer that points to the corresponding media program content.

In accordance with an exemplary embodiment of the invention, with reference to the exemplary steps of FIG. 2 of the method 200, in step 202, the media processing unit 153 may be transported by the user from the personal computer environment 151 such as the user's office to a media consumption environment 102 such as the user's living room. In accordance with step 203, the user may connect the media processing unit 103 to the television 155 through an auxiliary video/audio interface 158. Similarly, in step 204, the user may use his remote control 127 to call up the channel view or channel view 161 or channel guide 120 on the television screen 126. When the user brings up or initiates recall of the channel view or channel guide 120, the user may view the titles, for example, or other representation of the stored media content 123, 124, 125. Accordingly, the user may utilize remote control 127 to select and view one of the media content such as a meta file.

For example, the user may select the "son's soccer game" 123 and select a sub menu option that causes the digital images of the "son's soccer game" 123 to be displayed, one at a time in a digital photo album format, on the television screen 126. In another illustrative embodiment of the invention, the user may select the "daughter's wedding" 124 and select a sub menu option that may cause the digital video of the "daughter's wedding" 124 to be displayed on the television screen 126. As a further example, the user may select and listen to the stored digital audio such as Jazz music 125, on television 155 and/or a music or stereo component set 156 when the user selects the auxiliary audio interface 159 using the remote control 127. As a result, the user is able to have different types of media content, for example, digital video, digital images, digital audio stored on the media processing unit 153 and may use television 105, remote control 127, and the channel view 161 such as channel guide 120 as a common means to select and consume the stored media content.

In accordance with an aspect of the invention, media processing unit 153 may support a removable memory such as a CD, a DVD, a memory card, a flashcard, or any other type of removable memory. As a result, files containing metadata and media content may be copied from the personal computer 154 to the removable memory. The removable memory may be taken to the media processing unit 153, which may be fixed in the media consumption environment 152 and the removable memory may be loaded into the media processing unit 153 so that the files may be copied or transferred into the channel view or channel guide 161 of the associated with the media processing unit 153. Accordingly, the metadata may define a manner in which the media content may be scheduled into a particular channel of the channel view or channel guide 161.

As a further alternative, the media processing unit 153 may comprise a dial-up interface comprising a modem that may be adapted to allow the media processing unit 153 to be plugged into a telephone jack in order to facilitate file transfer of media to and/or from the media processing unit 153 to a remote location. In this regard, the media processing unit 153 may include a telephone interface such as a telephone modem. Notwithstanding, the media processing unit may also comprise a broadband communication interface that may facilitate communication via, for example, a cable, DSL or other broadband device interface.

For example, a user may connect a media processing unit into a telephone jack at the user's home and establish a dial-up connection to their mother's media processing unit located the mother's home. After the connection has been established, the user may download files from their media processing unit into their mother's media processing unit. After the downloading of the files is complete, the user's mother may then connect their media processing system to a television located at the mother's home and, using a remote control, view the content of the downloaded media files in a channel view or channel guide. Notwithstanding, the media processing unit 153 may also comprise an interface, for example, an Ethernet interface that may be utilized to provide a connection to the Internet connection. This interface may also be utilized to facilitate download of media content from, for example, a web site or a remote file server.

A major challenge is to be able to transfer and share many different types of digital media, data, and services between one device/location and another with ease while being able to index, manage, and store the digital media and data.

For example, it is desirable to be able to distribute and store many types of digital media in a PC and/or television environment in a user-friendly manner without requiring many different types of software applications and/or unique and dedicated interfaces. Any networking issues or other technical issues should be transparent to the users. It is also desirable to take advantage of existing hardware infrastructure, as much as possible, when providing such capability.

In an embodiment of the present invention, a media exchange network is provided that enables many types of digital media, data, and/or services to be stored, indexed, viewed, searched for, pushed from one user to another, and requested by users, using a media guide user interface. The media exchange network also allows a user to construct personal media channels that comprise his personal digital media (e.g., captured digital pictures, digital video, digital audio, etc.), request that third-party media channels be constructed from third-party digital media, and access the media channels pushed to him by other users on the media exchange network.

PC's may be used but are not required to interface to the media exchange network for the purpose of exchanging digital media, data, and services. Instead, set top-boxes or integrated MPS's (media processing systems) may be used with the media exchange network to perform all of the previously described media exchange functions using a remote control with a television screen.

Current set-top-boxes may be software enhanced to create a MPS that provides full media exchange network interfacing and functionality via a TV screen with a TV guide look-and-feel. PC's may be software enhanced as well and provide the same TV guide look-and-feel. Therefore, the media exchange network supports both PC's and MPS's in a similar manner. Alternatively, a fully integrated MPS may be designed from the ground up, having full MPS capability.

In the case of an MPS configuration, the user takes advantage of his remote control and TV screen to use the media exchange network. In the case of a PC configuration, the user takes advantage of his keyboard and/or mouse to use the media exchange network.

An MPS or enhanced PC is effectively a storage and distribution platform for the exchange of personal and third party digital media, data, and services as well as for bringing the conventional television channels to a user's home. An MPS and/or PC connects to the media exchange network via an existing communication infrastructure which may include cable, DSL, satellite, etc. The connection to the communication infrastructure may be hard-wired or wireless.

The media exchange network allows users to effectively become their own broadcasters from their own homes by creating their own media channels and pushing those media channels to other authorized users on the media exchange network, such as friends and family members.

Figure 3:
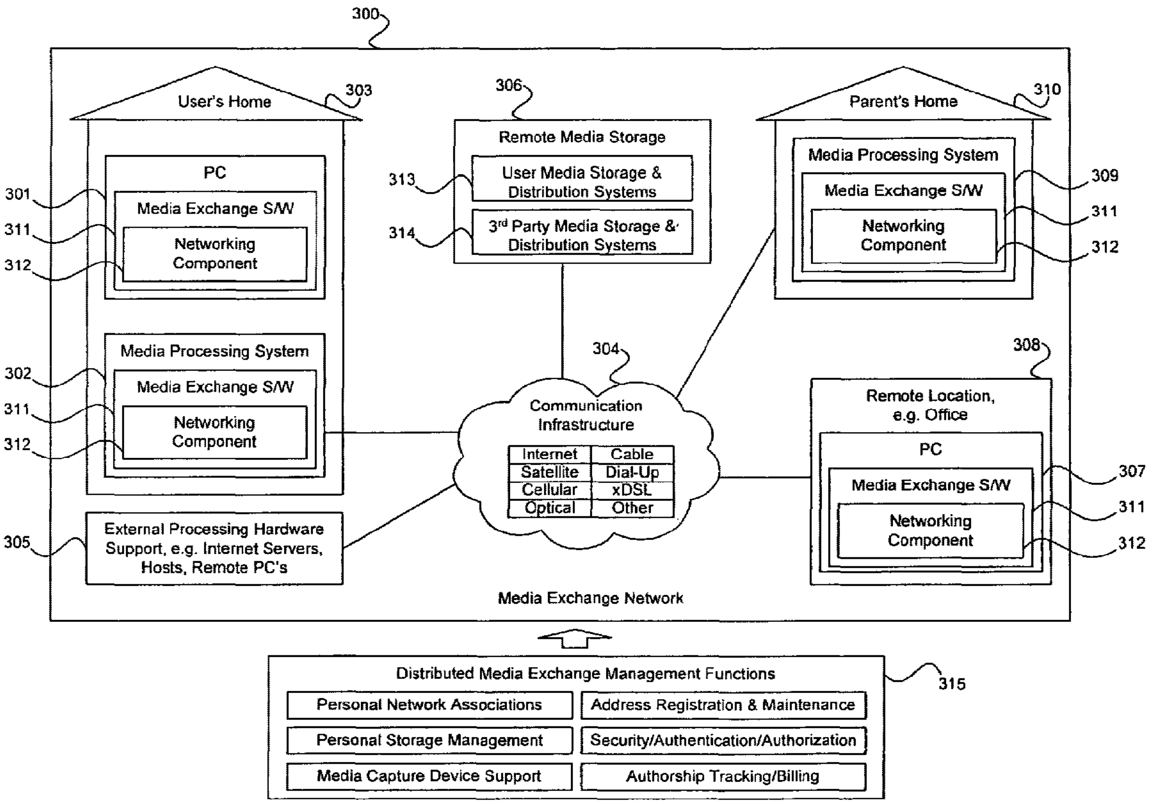
FIG. 3 is a schematic block diagram of a first exemplary media exchange network in accordance with an embodiment of the present invention.

FIG. 3 comprises a media exchange network 300 for exchanging and sharing digital media, data, and services in accordance with an embodiment of the present invention. The media exchange network 300 is a secure, closed network environment that is only accessible to pre-defined users and service providers. The media exchange network of FIG. 3 comprises a first PC 301 and a first media processing system (MPS) 302 at a user's home 303, a communication infrastructure 304, external processing hardware support 305, remote media storage 306, a second PC 307 at a remote location 308 such as an office, and a second MPS 309 at a parent's home 310.

The PC's 301 and 307 and the MPS's 302 and 309 each include a media exchange software (MES) platform 311 and a networking component 312 for connectivity. The MES platform 311 provides multiple capabilities including media "push" capability, media "access" capability, media channel construction/selection, image sequence selection, text and voice overlay, channel and program naming, interhome routing selection, authorship and media rights management, shared inter-home media experience, billing service, and an integrated media guide interface providing a TV channel guide look-and-feel.

The external processing hardware support 305 comprises at least one server such as a centralized internet server, a peer-to-peer server, or cable head end. The server may alternatively be distributed over various hosts or remote PC's. The MES platform 311 may also reside on the external processing hardware support server 305. The remote media storage 306 may comprise user media storage and distribution systems 313 and/or third party media storage and distribution systems 314.

The communication infrastructure 304 may comprise at least one of internet infrastructure, satellite infrastructure, cable infrastructure, dial-up infrastructure, cellular infrastructure, xDSL infrastructure, optical infrastructure, or some other infrastructure. The communication infrastructure 304 links the user's home 303, parent's home 310, remote media storage 306, and remote location office 308 to each other (i.e., the communication infrastructure 304 links all users and service providers of the media exchange network 300).

The various functions 315 of the media exchange network 300 comprise generating personal network associations, personal storage management, media capture device support, security/authentication/authorization support, authorship tracking and billing and address registration and maintenance. These media exchange management functions 315 may be distributed over various parts of the media exchange network 300. For example, the personal network associations and personal storage management functions may be integrated in the PC 301 at the user's home 303.

Figure 4:
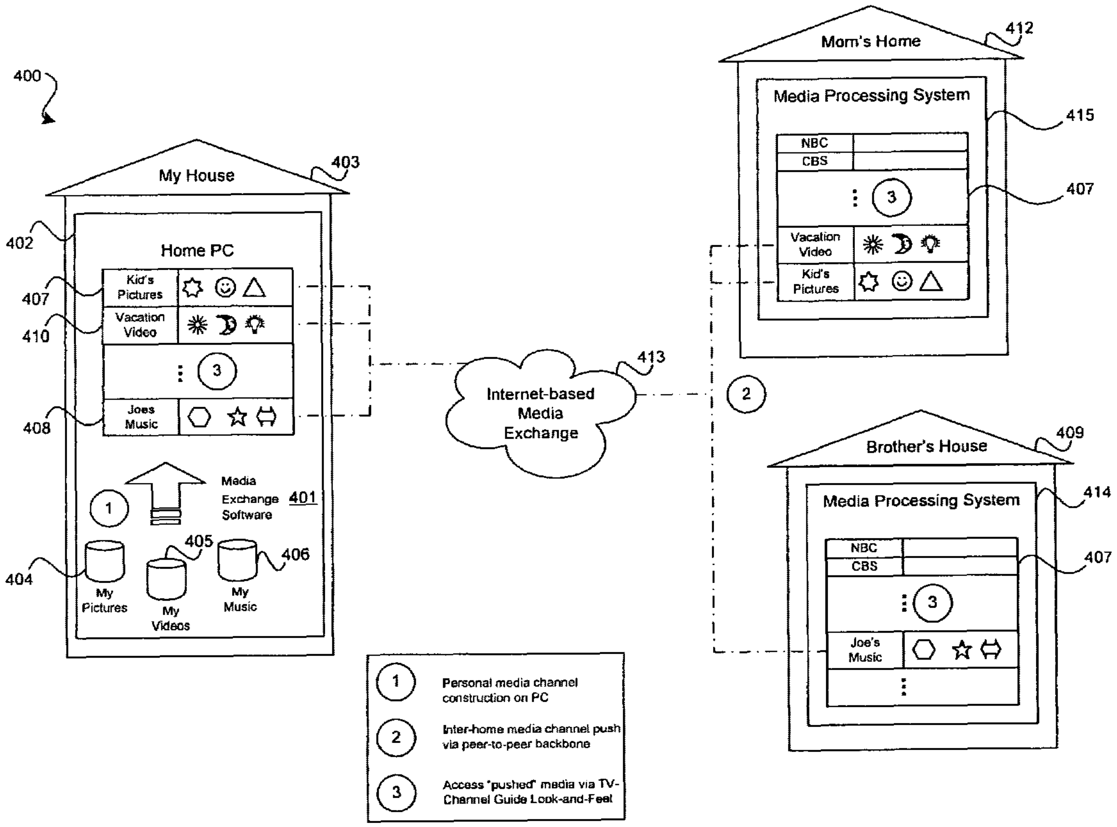
FIG. 4 is a schematic block diagram of performing personal media exchange over a second exemplary media exchange network in accordance with an embodiment of the present invention.

FIG. 4 illustrates an example of personal media exchange over a media exchange network 400 in accordance with an embodiment of the present invention. In step 1, the media exchange software (MES) platform 401 is used to construct personal media channels on a PC 402 by a user at "my house" 403. For example, with various media stored on the PC 402 such as digital pictures 404, videos 405, and music 406, the MES platform 401 allows the digital media to be organized by a user into several channels having a media guide user interface 407 on the PC 402.

In step 2, the user at "my house" 403 pushes a media channel 408 (e.g., "Joe's Music") to "brother's house" 409 and pushes two media channels 410 and 411 (e.g., "Vacation Video" and "Kid's Pictures") to "Mom's house" 412 via a peer-to-peer server 413 over the internet-based media exchange network 400. "Brother's house" 409 includes a first MPS 414 connected to the media exchange network 400. "Mom's house" 412 includes a second MPS 415 connected to the media exchange network 400. The MPS's 414 and 415 also provide a media guide user interface 407.

In step 3, brother and/or Mom access the pushed media channels via their respective media processing systems (MPS's) 414 and 415 using their respective MPS TV screens and remote controls.

Figure 5:
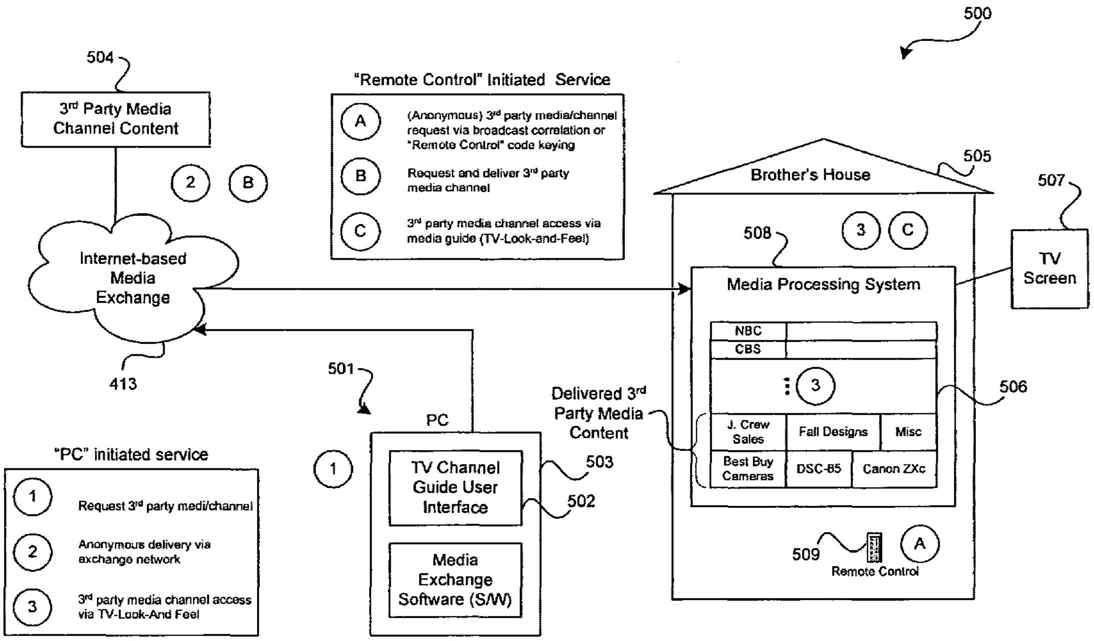
FIG. 5 is a schematic block diagram of performing third-party media exchange over a third exemplary media exchange network in accordance with an embodiment of the present invention.

FIG. 5 illustrates an example of third-party media exchange over a media exchange network 500 in accordance with an embodiment of the present invention. In step 1, a PC-initiated third-party request is made by a first party 501 via an internet based media exchange network 500 using a media guide user interface 502 on a PC 503. In step 2, an anonymous delivery of the requested third-party channel 504 is made to a second party 505 via the internet-based media exchange network 500. In step 3, the second party 505 accesses the third-party channel 504 using a media guide user interface 506 on a TV screen 507 that is integrated into an MPS 508.

Similarly, in step A, an MPS-initiated third-party request is made by a second party 505 via an internet-based media exchange network 500 using a media guide user interface 506 on a TV screen 507 using a remote control 509. The second party 505 may key in a code, using his remote control 509, that is correlated to a commercial or some other third party broadcast media. In step B, an anonymous delivery of the requested third-party channel 504 is made to a first party 501 via the internet-based media exchange network 500. In step C, the first party 501 accesses the third-party channel 504 using a media guide user interface 502 on a PC 503.

Figure 6:
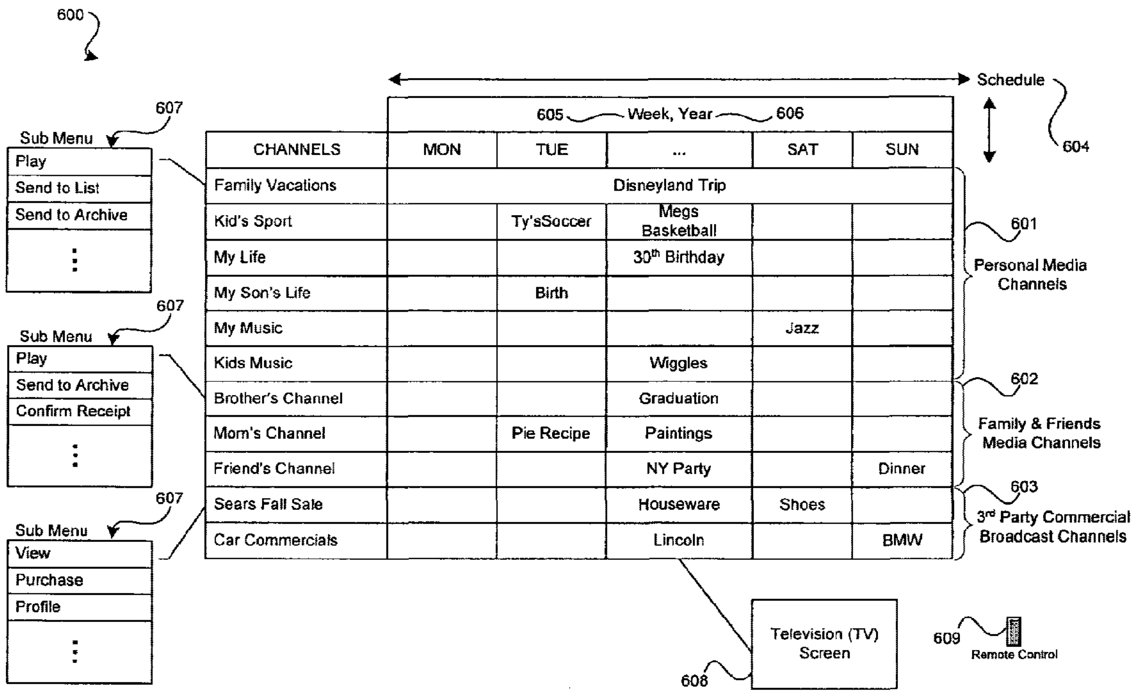
FIG. 6 is an exemplary illustration of a TV guide channel user interface in accordance with an embodiment of the present invention.

FIG. 6 illustrates a media guide user interface 600 in accordance with an embodiment of the present invention. The media guide user interface 600 may be displayed on a TV screen 608 and controlled by a remote control device 609. Also, the media guide user interface 600 may be displayed on a PC monitor and controlled by a keyboard or mouse.

The media guide user interface 600 may be configured not only for conventional TV channels but also for personal media channels 601 that are constructed by a user of a media exchange network, friend's and family's media channels 602 constructed by friends and family, and third party channels 603 that are constructed by third parties either upon request by a user of a media exchange network or based on a profile of a user.

The personal media channels 601 may include, for example, a "family vacations channel", a "kid's sports channel", a "my life channel", a "son's life channel", a "my music channel", and a "kid's music channel". The friends and family media channels 602 may include, for example, a "brother's channel", a "Mom's channel", and a "friend's channel". The third party media channels 603 may include, for example, a "Sears Fall sale channel" and a "car commercials channel".

Each media channel may correspond to a schedule 604 showing, for example, a week 605 and a year 606. For example, under the "kid's sports channel", Ty's soccer game could be scheduled to be viewed on Tuesday of the current week 605 and current year 606. For each media channel, a sub-menu 607 allows for selection of certain control and access functions such as "play", "send to list", "send to archive", "confirm receipt", "view", "purchase", and "profile".

Figure 7:
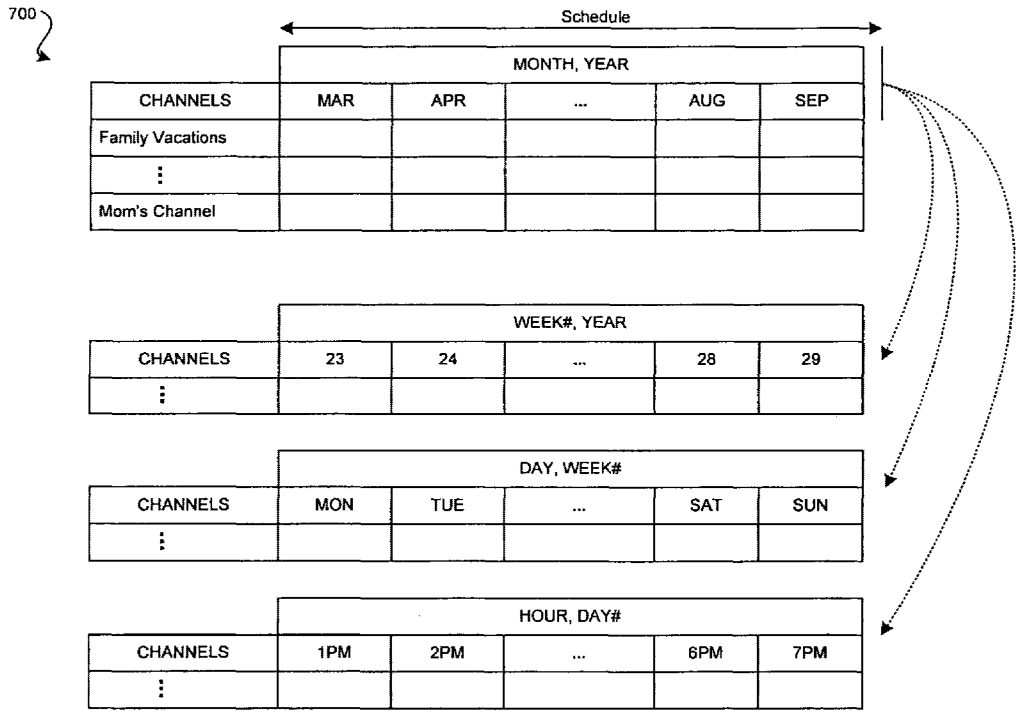
FIG. 7 is an exemplary illustration of several instantiations of a TV guide channel user interface of FIG. 4 in accordance with an embodiment of the present invention.

FIG. 7 illustrates possible multiple instantiations of a media guide user interface 700 in accordance with an embodiment of the present invention. The media guide user interface 700 may be viewed with a schedule having formats of, for example, "month, year", "week#, year", "day, week#", or "hour, day".

Referring to FIG. 8, a user of a media exchange network may push a media channel (e.g., "Vacation in Alaska Video") to a friend who is on the same media exchange network. The media guide user interface 800 may give the friend several options 801 for how to accept and download the pushed media in accordance with an embodiment of the present invention.

For example, a first, most expensive option 803 may be "Express Delivery" which would deliver the pushed media to the friend in 18 minutes using queuing and cost $1.20, for example. The pushed media may be stored in a file in an MPEG 2 format that was recorded at a rate of 4 Mbps, for example. Queuing comprises buffering and delivering a previous part of the media and then buffering and delivering a next part of the media. For example, a first six minutes of the "Vacation in Alaska Video" may be buffered and delivered first, then a second six minutes may be buffered and delivered next, and so on until the entire media is delivered.

A second, less expensive option 802 may be "Normal Delivery" which would deliver the pushed media in 2 hours and 13 minutes without queuing and cost $0.59, for example. The pushed media may be stored in a file in an MPEG 2 format that was recorded at a rate of 1.5 Mbps, for example. [SO] A third, least expensive option 804 may be "Overnight Delivery" which would deliver the pushed media by the next morning and cost only $0.05, for example. The pushed media may be stored in a file in an MPEG 2 format that was recorded at a rate of 19 Mbps and stored on a server, for example.

Figure 9A:
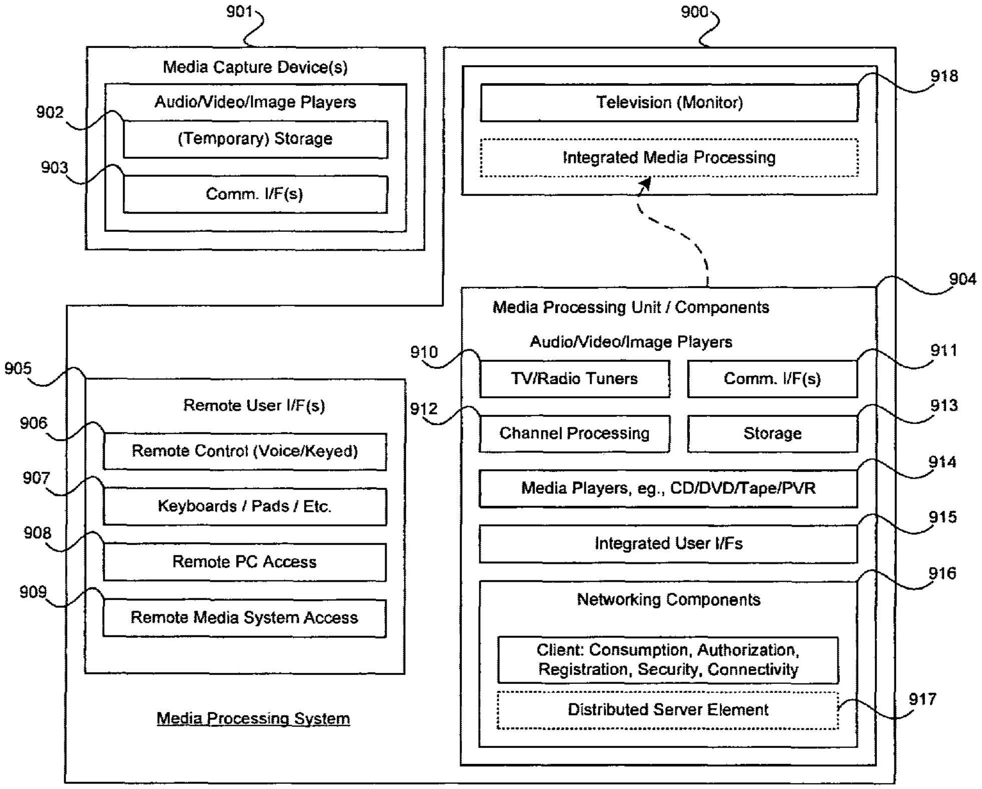
FIG. 9A is a schematic block diagram of a media processing system (MPS) interfacing to media capture peripherals in accordance with an embodiment of the present invention.

FIG. 9A illustrates the detailed elements of a media processing system (MPS) 900 and media capture devices 901 in accordance with an embodiment of the present invention. The media capture devices 901 may comprise audio, video, and image players, such as digital cameras, digital camcorders, and MP3 players, that each include a temporary storage area 902 and a communication interface 903 such as, for example, a USB interface or a wireless interface. The media capture devices 901 have the capability to interface to an MPS and a PC.

The MPS 900 comprises a media processing unit (MPU) 904, remote user interface(s) 905, and a TV screen 918 to provide integrated media processing capability and indirect user interface capability. The remote user interfaces 905 may comprise a voice or keyed remote control 906, keyboards and pads 907, a remote PC access interface 908, and a remote media system access interface 909 (i.e., providing access from another MPS).

The media processing unit (MPU) 904 comprises TV and radio tuners 910 for image and audio consumption, communications interfaces 911, channel processing 912 (creating, storing, indexing, viewing), storage 913, media players 914 (CD, DVD, Tape, PVR, MP3), an integrated user interface 915 (to provide a TV channel guide look-and feel), networking components 916 to provide client functions such as consumption (billing), authorization (e.g., using digital certificates and digital ID's), registration, security, and connectivity. In an alternative embodiment of the present invention, the networking components 916 may include a distributed server element 917 that is part of a distributed server.

Figure 9B:
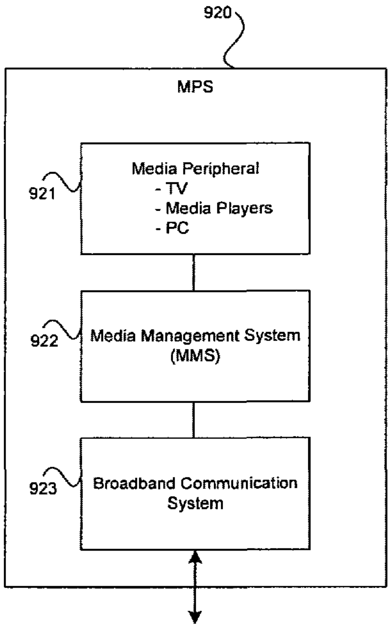
FIG. 9B illustrates an alternative embodiment of a media processing system (MPS) in accordance with various aspects of the present invention.

FIG. 9B illustrates an alternative embodiment of a media processing system (MPS) 920 in accordance with various aspects of the present invention. The MPS 920 is essentially an enhanced set-top-box for viewing and interacting with various user interfaces, media, data, and services that are available on the media exchange network using, for example, a remote control. The MPS 920 comprises a media peripheral 921, a MMS (media management system) 922, and a broadband communication interface 923.

The media peripheral 921 may include a TV (television), a PC (personal computer), and media players (e.g., a CD player, a DVD player, a tape player, and a MP3 player) for video, image, and audio consumption of broadcast and/or personal channels. The broadband communication interface 923 may include internal modems (e.g., a cable modem or DSL modem) or other interface devices in order to communicate with, for example, a cable or satellite head end.

The MMS 922 includes a software platform to provide functionality including media "push" capability, media "access" capability, media channel construction/selection, image sequence selection, text and voice overlay, channel and program naming, inter-home routing selection, authorship and media rights management, shared inter-home media experience, billing service, and a media guide user interface providing an integrated TV channel guide look-and-feel.

Figure 10:
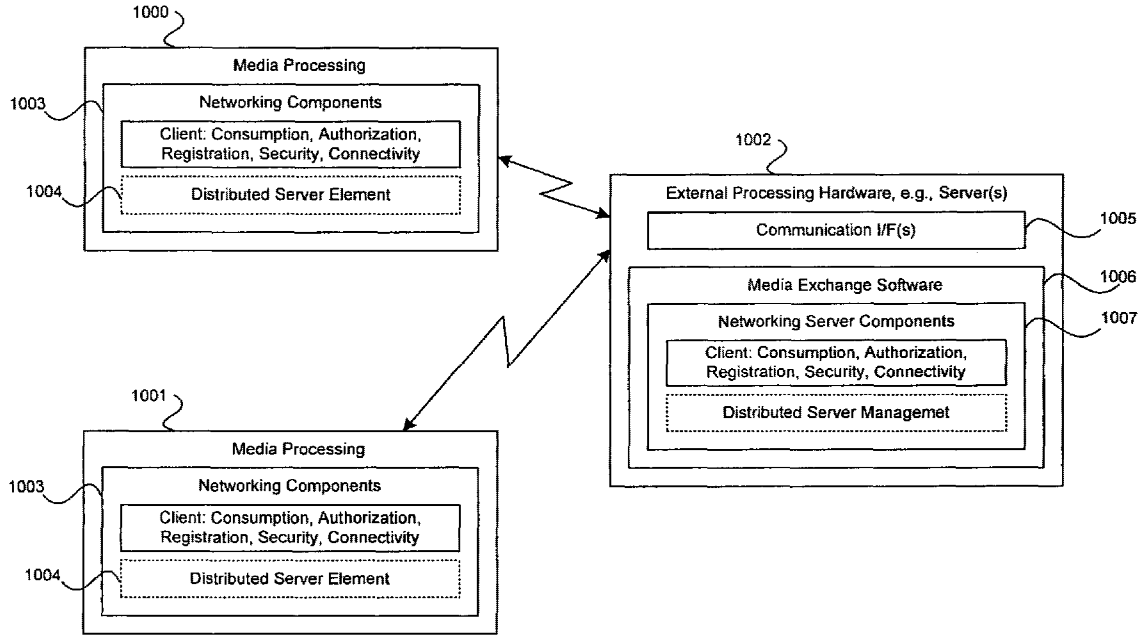
FIG. 10 is a schematic block diagram of a PC and an MPS interfacing to a server on a media exchange network in accordance with an embodiment of the present invention.

FIG. 10 illustrates connectivity between a PC 1000, an MPS 1001, and external processing hardware 1002 (e.g., a server) in accordance with an embodiment of the present invention. The PC 1000 and MPS 1001 include networking components 1003 to provide client functions such as consumption (billing), authorization, registration, security, and connectivity. Alternatively, the PC 1000 and MPS 1001 may include a distributed server element 1004 that is part of a distributed server.

The PC 1000 and MPS 1001 connect to the external processing hardware 1002 via wired or wireless connections. The external processing hardware 1002 comprises a distributed server or peer-to-peer server. The external processing hardware 1002 also comprises communication interfaces 1005 (e.g., cable interfaces, optical interfaces, etc.) and a media exchange software (MES) platform 1006. The MES platform 1006 in the external processing hardware 1002 allows for communication with the PC 1000 and MPS 1001 which may also use the same MES platform 1006. The external processing hardware 1002 also includes networking server components 1007 to provide the similar client functions such as consumption (billing), authorization, registration, security, and connectivity at the server side.

Figure 11:
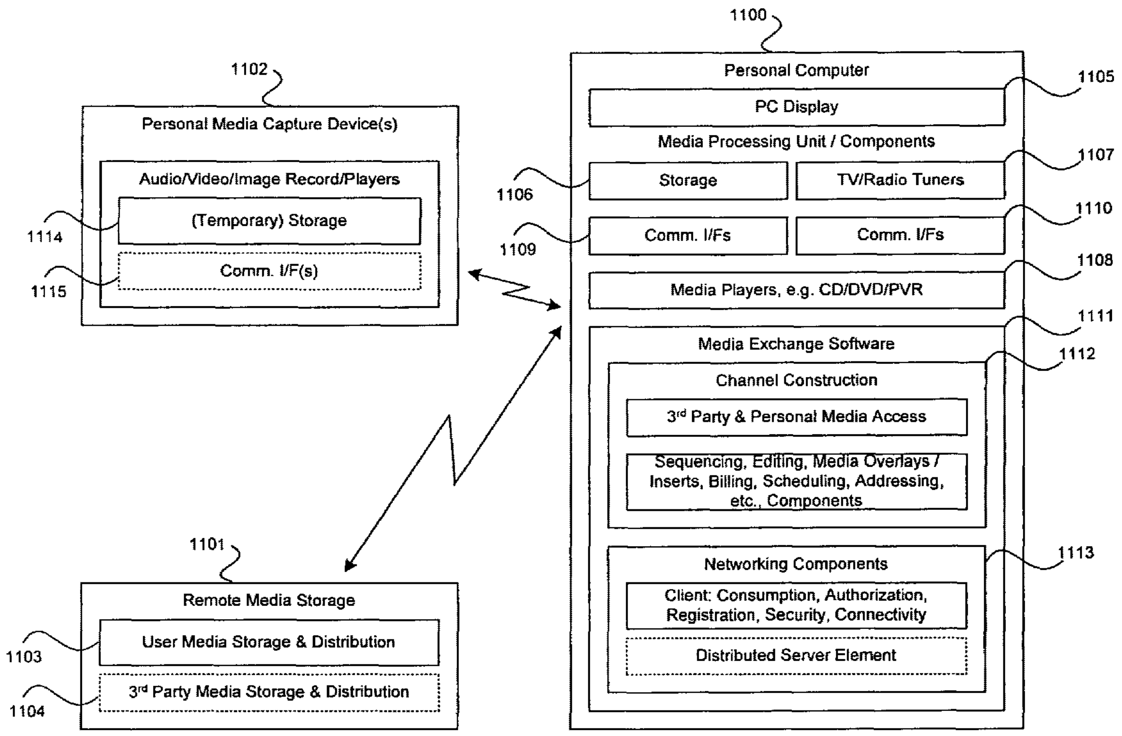
FIG. 11 is a schematic block diagram of a PC interfacing to personal media capture devices and remote media storage on a media exchange network in accordance with an embodiment of the present invention.

FIG. 11 illustrates connectivity between a PC 1100, remote media storage 1101, and personal media capture devices 1102 when the PC 1100 is used as the primary distributor of digital media such as in the case of PC-to-PC operation, in accordance with an embodiment of the present invention. The personal media capture devices 1102 and remote media storage 1101 connect to the PC 1100 via a wireless or wired connection. The remote media storage 1101 provides user media storage and distribution 1103 as well as third party media storage and distribution 1104. The personal media capture devices 1102 provide temporary storage 1114 and communication interfaces 1115.

Viewing is done using a PC monitor 1105 instead of a television screen. The PC 1100 may include storage 1106, TV/radio tuners 1107 for media consumption, media players 1108, and communication interfaces 1109 and user interfaces 1110 similar to those for the MPS of FIG. 9A. The PC 1100 includes a media exchange software (MES) platform 1111 that provides channel construction capability 1112 and networking capability 1113. The channel construction capability 1112 allows third party and personal media access, sequencing, editing, media overlays and inserts, billing, scheduling, and addressing.

Another embodiment of the invention may provide a system for porting information between locations in a communication network. Certain embodiments of the system may comprise a storage unit processor that may be configured to store media along with metadata associated with the media on the storage unit whenever the storage unit is coupled to a communication device at a first location. The storage unit may be a media processing unit and may include a media exchange software platform that may comprise a media exchange software processor. The processor may be configured to cause a channel guide, media guide and/or device guide comprising representations of the stored media to be presented on a television in a second location such as a home whenever the storage unit is transferred to a home and coupled to a second communication device located within the home.

In response to receiving a selection via the presented channel guide, media guide or device guide, the processor may display one or more media files corresponding to the received selection on television and/or a media player. The media player may be an audio player such as an MP3 player located within the home. The processor may be adapted to receive the stored media at the first location via at least one of a wired and a wireless interface. Notwithstanding, the processor may also cause metadata information associated with the file to be displayed.

In accordance with another aspect of the invention, the processor may also transfer at least a portion of the stored media from the storage unit to a storage device associated with a television within the home and/or a media player in the home. The processor may store at least a portion of the transferred media on a storage device associated with the television and/or the media player within the home. Presenting of the representation of the stored media within the channel guide may be scheduled by the processor based on at least a portion of the stored metadata, the latter of which may be generated by or within the storage unit. The processor may also be adapted to cause metadata information to be displayed independent of the media file in accordance with various aspects of the invention. Media files received from the second communication device whenever the storage unit is coupled to the second communication device, may also be stored in the storage unit by the processor.

Accordingly, the present invention may be realized in hardware, software, or a combination of hardware and software. The present invention may be realized in a centralized fashion in one computer system, or in a distributed fashion, where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:

storing media and meta-data corresponding to the stored media, the storing occurring at a first location of a first communication device;

causing, based on the meta-data corresponding to the stored media, creation of a channel guide comprising representations of the stored media that can be selected for presentation on a television in a second location, when the first communication device is communicatively coupled to a second communication device at the second location; and in response to receiving a selection via the presented channel guide, causing displaying based on the meta-data corresponding to the stored media, of at least one media file corresponding to the received selection on one or both of the television and/or a media player in the second location.

2. The method according to claim 1, further comprising receiving the stored media at the first location via one or both of a wired and/or a wireless interface.

3. The method according to claim 1, further comprising transferring at least a portion of the stored media from the first location to a storage device corresponding to the one or both of the television and/or a media player in the second location.

4. The method according to claim 3, further comprising causing storage of at least a portion of the transferred stored media on the storage device corresponding to the one or both of the television and/or the media player in the second location.

5. The method according to claim 1, further comprising scheduling the presenting of the representation of the stored media within the channel guide based on at least a portion of the stored meta-data.

6. The method according to claim 1, further comprising generating at least a portion of the meta-data by the first communication device.

7. The method according to claim 1, further comprising causing display of meta-data corresponding to the displayed at least one media file independent of the displaying of the at least one media file.

8. The method according to claim 1, further comprising storing at least one media file received from the second communication device when the first communication device is coupled to the second communication device.

9. The method according to claim 1, wherein the second location is a home.

10. A method for communication, the method comprising:
storing at a first location, media and meta-data corresponding to the stored media;
causing presenting, based on the meta-data corresponding to the stored media, a channel guide comprising representations of the stored media on a television in a second location, when the stored media and the meta-data corresponding to the stored media is transferred from the first location to the second location; and
in response to receiving a selection via the presented channel guide, causing displaying based on the meta-data corresponding to the stored media, of at least one media file corresponding to the received selection on one or both of the television and/or a media player in the second location.

11. The method according to claim 10, further comprising receiving the stored media at the first location via one or both of a wired and/or a wireless interface.

12. The method according to claim 10, further comprising transferring at least a portion of the stored media from the first location to a storage device corresponding to the one or both of the television and/or a media player in the second location.

13. The method according to claim 10, further comprising scheduling the presenting of the representation of the stored media within the channel guide based on at least a portion of the stored meta-data.

14. The method according to claim 10, further comprising causing display of meta-data corresponding to the displayed at least one media file independent of the displaying of the at least one media file.

15. A system for communication, the system comprising:
one or more circuits operable to store at a first location, media and meta-data corresponding to the stored media;
the one or more circuits operable to present, based on the meta-data corresponding to the stored media, a channel guide comprising representations of the stored media on a television in a second location, when the stored media and the meta-data corresponding to the stored media is transferred from the first location to the second location; and
in response to receiving a selection via the presented channel guide, the one or more circuits causes displaying based on the meta-data corresponding to the stored media, at least one media file corresponding to the received selection on one or both of the television and/or a media player in the second location.

16. The system according to claim 15, wherein the one or more circuits are operable to receive the stored media at the first location via one or both of a wired and/or a wireless interface.

17. The system according to claim 15, wherein the one or more circuits are operable to transfer at least a portion of the stored media from the first location to a storage device corresponding to the one or both of the television and/or a media player in the second location.

18. The system according to claim 17, wherein the one or more circuits are operable to cause storage of at least a portion of the transferred stored media on the storage device corresponding to the one or both of the television and/or the media player in the second location.

19. The system according to claim 15, wherein the one or more circuits are operable to schedule the presenting of the representation of the stored media within the channel guide based on at least a portion of the stored meta-data.

20. The system according to claim 15, wherein the one or more circuits are operable to cause display of meta-data corresponding to the displayed at least one media file independent of the displaying of the at least one media file.

* * * * *